(12) United States Patent
Muerza

(10) Patent No.: US 7,513,133 B2
(45) Date of Patent: Apr. 7, 2009

(54) PADLOCK DEVICE FOR THE SHAFT OF TWO-WHEELED VEHICLES

(75) Inventor: Alfredo Muerza, Guipuzcoa (ES)

(73) Assignee: Luma Industrias, S.A., Hernani (Guipuzcoa) (ES)

( * ) Notice: Subject to any disclaimer, the term of this patent is extended or adjusted under 35 U.S.C. 154(b) by 391 days.

(21) Appl. No.: 11/267,843

(22) Filed: Nov. 4, 2005

(65) Prior Publication Data

US 2007/0101779 A1  May 10, 2007

(51) Int. Cl.
B62H 5/00 (2006.01)
(52) U.S. Cl. .................. 70/233; 70/18; 70/30; 70/49
(58) Field of Classification Search .................. 70/233, 70/18, 30, 49
See application file for complete search history.

(56) References Cited

U.S. PATENT DOCUMENTS

| | | | | | |
|---|---|---|---|---|---|
| 1,005,852 | A | * | 10/1911 | Lewis | 70/43 |
| 1,350,392 | A | * | 8/1920 | Taylor | 70/43 |
| 1,851,313 | A | * | 3/1932 | Johnson | 70/260 |
| 3,435,642 | A | * | 4/1969 | Del Pesco | 70/49 |
| 4,075,878 | A | * | 2/1978 | Best | 70/49 |
| 4,114,409 | A | * | 9/1978 | Scire | 70/225 |
| 4,724,692 | A | * | 2/1988 | Turin et al. | 70/225 |
| 4,964,287 | A | * | 10/1990 | Gaul | 70/233 |
| 5,027,628 | A | * | 7/1991 | De Rocher et al. | 70/233 |
| 5,291,763 | A | * | 3/1994 | Cuisinot | 70/201 |
| 5,479,836 | A | * | 1/1996 | Chang | 74/551.1 |
| 5,560,232 | A | * | 10/1996 | Chen | 70/30 |
| 5,568,740 | A | * | 10/1996 | Lin | 70/49 |
| 6,026,664 | A | * | 2/2000 | Lin | 70/49 |
| 6,055,833 | A | * | 5/2000 | Ding-Chiang | 70/39 |
| 6,152,541 | A | * | 11/2000 | Huber | 301/124.2 |
| 6,263,711 | B1 | * | 7/2001 | Kuo | 70/18 |
| 6,349,575 | B1 | * | 2/2002 | Bentley | 70/18 |
| 6,386,005 | B1 | * | 5/2002 | Kuo | 70/28 |
| 6,408,659 | B1 | * | 6/2002 | Chang | 70/19 |
| 6,425,642 | B1 | * | 7/2002 | Huber | 301/124.2 |
| 6,439,006 | B1 | * | 8/2002 | Tsai | 70/28 |
| 6,457,336 | B1 | * | 10/2002 | Bremicker | 70/34 |
| 6,553,793 | B1 | * | 4/2003 | Chen | 70/33 |
| 6,782,723 | B2 | * | 8/2004 | Chen | 70/49 |
| 6,923,027 | B1 | * | 8/2005 | Kuo | 70/49 |
| RE38,873 | E | * | 11/2005 | Denby et al. | 70/233 |
| 7,076,976 | B1 | * | 7/2006 | Goldman | 70/33 |
| 7,076,978 | B2 | * | 7/2006 | Denby | 70/233 |
| 7,104,093 | B2 | * | 9/2006 | Ling et al. | 70/30 |
| 7,281,400 | B2 | * | 10/2007 | Muerza | 70/233 |
| 2002/0073747 | A1 | * | 6/2002 | Chen | 70/49 |
| 2005/0262904 | A1 | * | 12/2005 | Ling et al. | 70/49 |

* cited by examiner

Primary Examiner—Suzanne D Barrett
(74) Attorney, Agent, or Firm—Lucas & Mercanti, LLP

(57) ABSTRACT

A padlock device for the shaft of two-wheeled vehicles, which comprises a pin (3), a lever (4) mounted on said pin (3) and a sliding bolt (8), a sliding lock body (9) actuated by a key (10) and a helical compression spring (11), and means for locking the lever (4) in rotation with respect to the pin (3) which are activated by actuating the key (10) in conjunction with a sliding of the assembly in which said bolt (8) and lock body (9) are capable of adopting forward and rearward operational positions which correspond to the active and non-active states of these locking means.

4 Claims, 4 Drawing Sheets

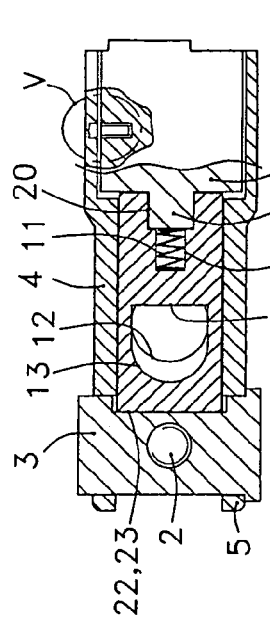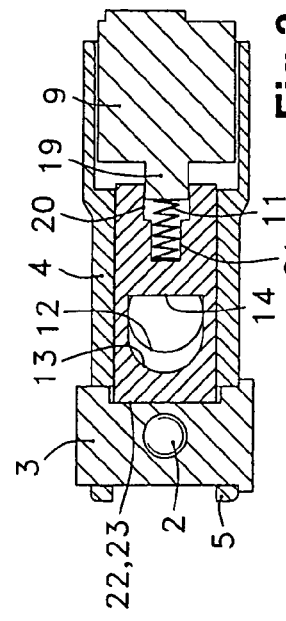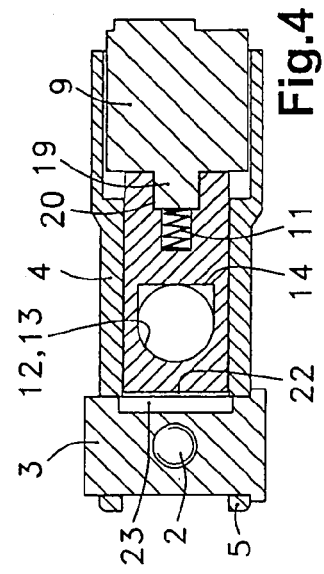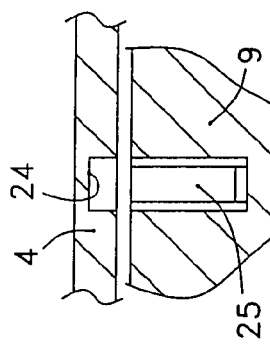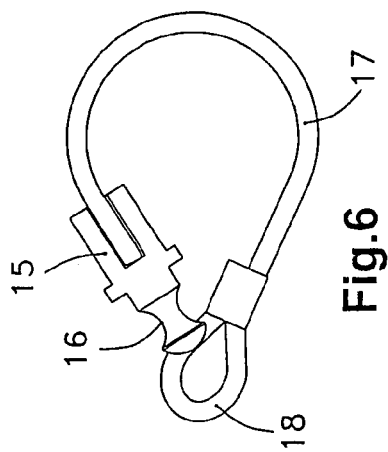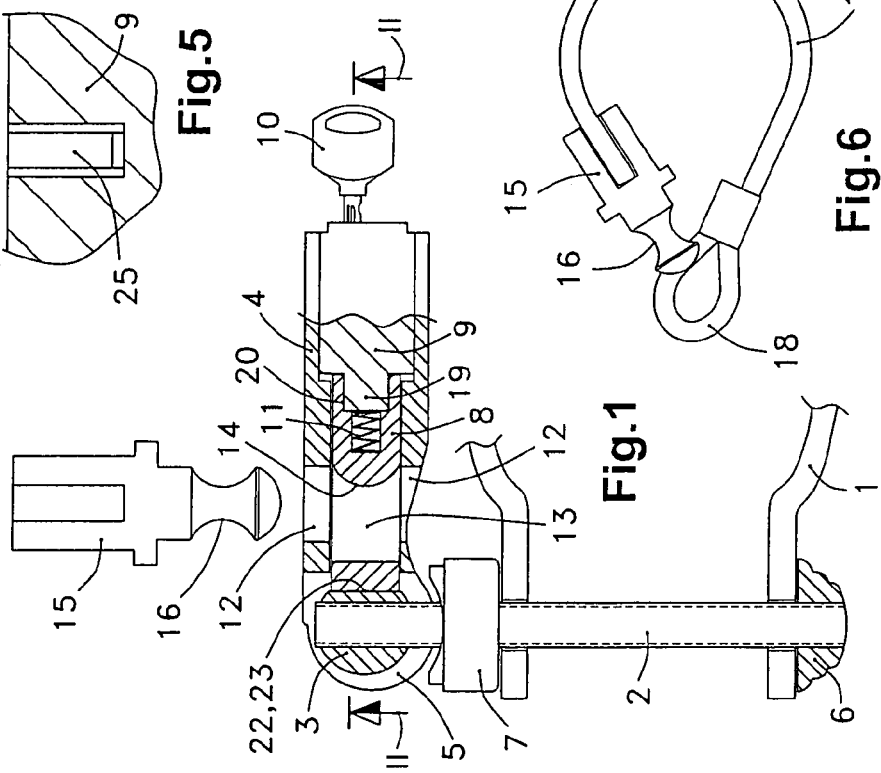

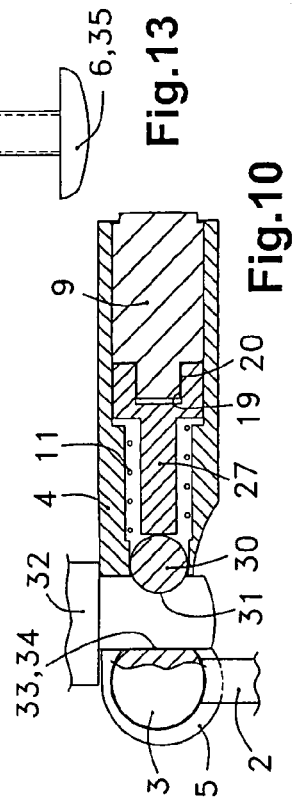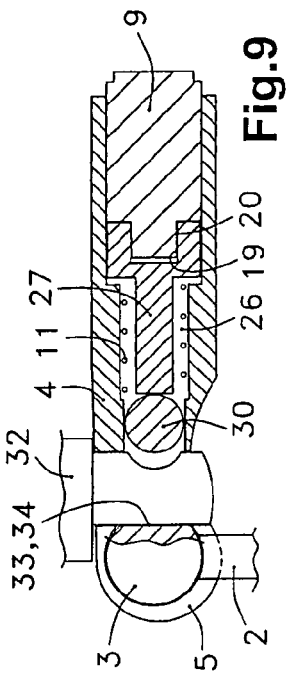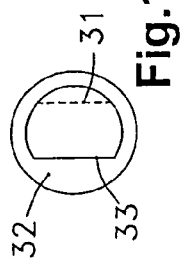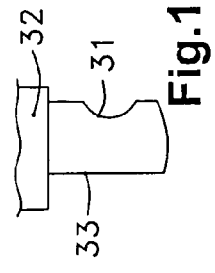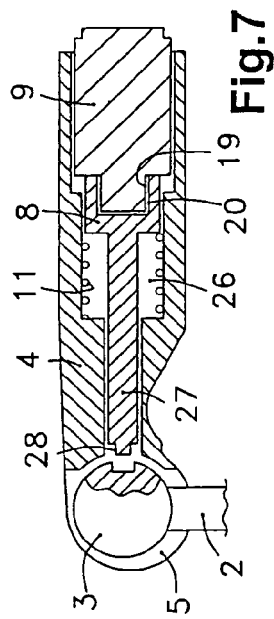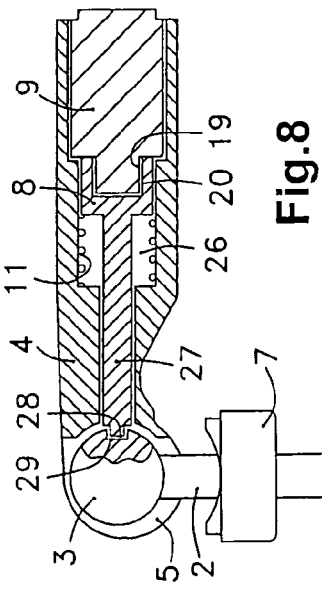

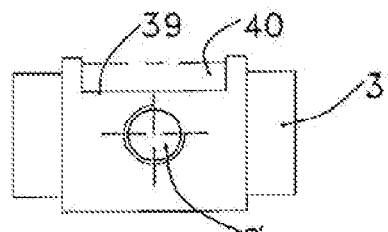
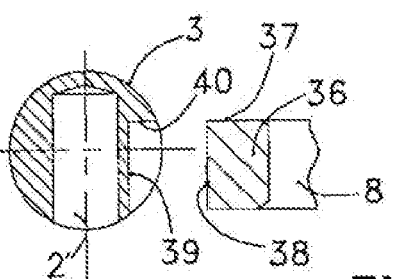
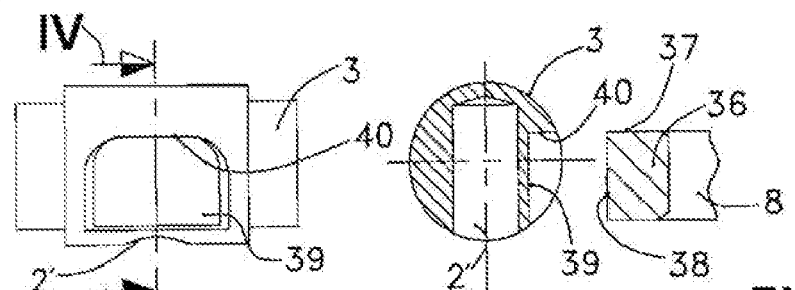
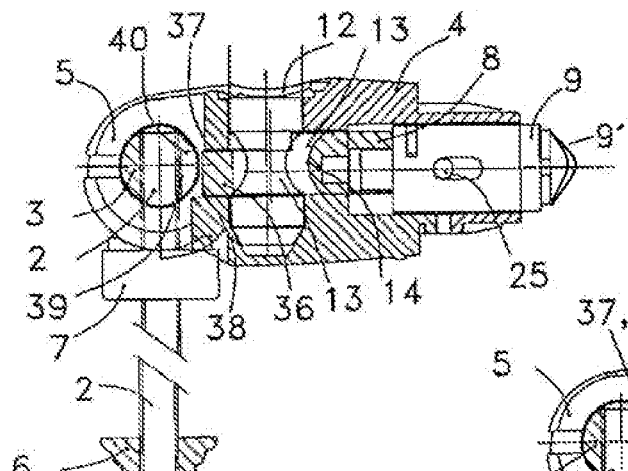
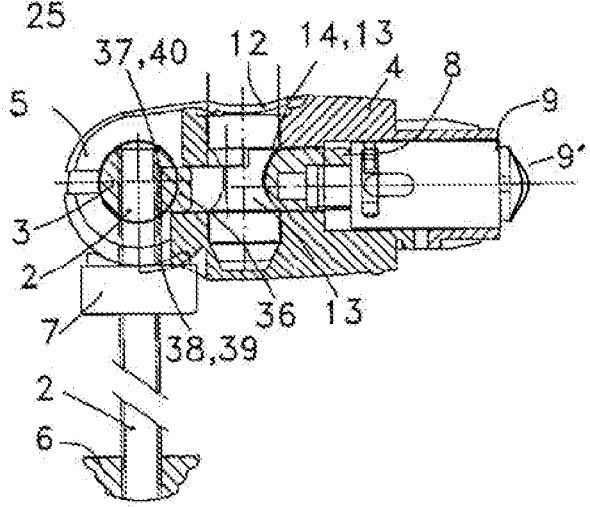

PADLOCK DEVICE FOR THE SHAFT OF TWO-WHEELED VEHICLES

FIELD OF THE INVENTION

The present invention relates to a padlock device for the shaft of two-wheeled vehicles such as a bicycle or a motorcycle. This shaft may consist of the telescopic coupling of tubes for mounting the seat of a bicycle or the handlebar shaft allowing height adjustment. More specifically, this device is designed as an antitheft security device for the component mounted on the shaft, such as the seat of a bicycle or the handlebars.

PRIOR ART

Devices are known having a general composition comprising a bracket, a rod, a pin, a lever, an eccentric lever head, a stop and a counterplate. The bracket clamps a chassis component of the vehicle, the rod passes through the ends of the bracket, the pin is incorporated at one end of the rod, the eccentric head of the lever is mounted so as to be able to rotate on said pin, the stop is at the other end of the rod to the pin, and the counterplate is mounted so as to be able to slide freely on the rod between the stop and the eccentric head.

These devices do not offer security against theft; they are merely designed to securely fasten the seat through the placing of the lever in a clamping position whereby the bracket strongly clamps the shaft, preventing the seat from moving or coming loose. Thus, all that is required is for the lever to be brought into its release position to allow the position of the seat to be adjusted or the shaft to be removed.

Moreover, the more expensive the bicycle and its parts, the greater the need to have some kind of antitheft security system.

Within this general composition, the shaft padlock is designed such that a pin, as an independent component, is coupled securely to the rod, the lever is mounted so as to be able to rotate on the pin and has within it an assembly lying radially with respect to the pin and that, based on this, it incorporates, at least, a sliding bolt, a sliding lock body actuated by a key and a helical compression spring, and there are means for locking the lever in rotation with respect to the pin which are activated by actuating the key in conjunction with a sliding of the assembly inside the lever in which said bolt and lock body are each capable of adopting forward and rearward operational positions which correspond to the active and non-active states of these locking means.

The whole made up of the bolt and the lock body bears the axial load arising from the locked state of the padlock which is produced by the reaction of the front flat part of the pin when an attempt is made to force opening when the padlock is in the locked state. This axial load is converted into a cutting force applied to the locking piece of the lock, whose purpose is to ensure that the lock body is securely mounted inside the lever body. This may damage said locking piece, something which must be avoided.

SUMMARY OF THE INVENTION

The present Invention comprises a padlock for the shaft of two-wheeled vehicles such as bicycles and motor cycles, constituting an antitheft security element therefor (and for other similar components), at the same time making it possible to ensure the actual vehicle is not stolen by immobilizing it with respect to some fixed outdoor point, such as a post, tree, anchoring point of a building, etc.

The present invention proposes a padlock for the shaft of two-wheeled vehicles such as bicycles and motor cycles. This padlock has an unusual composition comprising a pin which, as an independent component, is coupled securely to said rod, and said lever is mounted so as to be able to rotate on said pin and has within it an assembly lying radially with respect to the pin and, based on this, it incorporates, at least, a sliding bolt, a sliding lock body actuated by a key and a helical compression spring, and there are means for locking the lever in rotation with respect to the pin which are activated by actuating the key in conjunction with a sliding of said assembly inside the lever in which said bolt and lock body are each capable of adopting forward and rearward operational positions which correspond to the active and non-active states of these locking means.

A further feature of the invention is that said lever has an orifice passing right through it.

In accordance with the above, the invention comprises a variant in which said bolt has a window having one edge which is transverse and rear with respect to the operational forward movement of the bolt toward the pin and, in relation to said rearward and forward operational positions of this bolt, this window can be circumscribed on the virtual cylinder defined by said lever orifice or its said rear edge can overlap this virtual cylinder; wherein the edge of the window has a curved/convex profile which matches the profile of a recess in a locking endpiece which is mounted on one end of an antitheft collar which has at its other end a loop through which this locking endpiece can pass; wherein the compression spring is mounted between the bolt and the lock body, so that the spring has one end permanently pressed against a front peg of the body which in its operational path fits slidingly in a rear cavity in the bolt, while the other end of this spring is housed in a hollow made in the bottom of this rear cavity, it being possible for the spring to be fully inserted in this hollow, in a state of maximum relative compression when said bolt and body are in their forward operational positions; wherein the means for locking the lever in rotation with respect to the pin consist in that the bolt has a flat front end face which matches a flat part made on the periphery of the pin and wherein when the bolt is in its forward operational position, said end face is pressed against said flat part.

Based on the composition explained above, the antitheft function of the invention results from the fact that in the forward position of the lock body the spring is compressed in the hollow of the bolt cavity and said bolt is pushed so that it also takes up its forward position in which its flat end face is pressed against the flat part of the pin, preventing the lever from turning with respect to the latter. This forward position of the lock body, and hence of the bolt, is lockable as the lever has on its inner wall a notch which can accommodate within it a locking piece of the lock when it is locked by turning the key. In this forward position the key is turned to the locked position, giving rise to axial locking until, when the key is turned the other way, the open position is assumed and the action of the spring pushes the lock body to its retracted position and remains ready to act elastically to allow the bolt to be retracted when, when the lever is opened, the lever end face is pushed by the pin flat part which stays fixed in rotation.

This invention offers, if desired, an additional service allowing the vehicle to be secured to a post or the like so as to leave it parked secured against theft, with the possibility of also passing the cable through the wheel, helmet or anything else to be secured against theft. This is possible by virtue of the fact that when open, the way the orifice in the lever and the window in the bolt are arranged allows said locking endpiece to be inserted after passing it through the loop of the antitheft collar. Thus, when the device is locked as described above, this endpiece is locked with respect to the lever.

Another variant according to the invention consists in that said bolt and lock body are joined together in such a way as to be axially immobilized with respect to one another, said bolt is mounted so as to fit slidingly in a chamber and it narrows at the front forming a stem which passes through the bottom of this chamber and has at its end a protuberance which, when the bolt is in the forward position, is housed in a recess in the pin, and said helical compression spring is placed in the chamber around the stem and between the front of the bolt and the bottom of this chamber. This variant does not offer the additional feature of an antitheft collar for the vehicle.

Another variant, which is a combination of the above two, consists in that said bolt and lock body are joined together in such a way as to be axially immobilized with respect to one another, said bolt is mounted so as to fit slidingly in a chamber and it narrows at the front forming a stem whose tip is pressed against a ball or roller which projects partially out of the chamber by a part which matches a recess made in a locking projecting part opposite a flat side which penetrates said orifice, sliding while pressing against a flat section formed at the periphery of the pin.

In all the variants, the lock body is locked in its forward position in the way described with reference to the first variant.

Also in all variants, there are two possible features of the invention relating to ways of adjusting the effective length of the rod according to the diameter of the shaft. According to one of these modes, said rod is screwed through said pin in a selectively variable manner and widens at its other end to form a one-piece head with a topography which cannot be grasped by rotary-action tools. According to the other means of adjustment, said rod is screwed through said pin in a selectively variable manner and, at the other end of this rod, said stop is screwed into said pin having an outer topography which cannot be grasped by rotary-action tools and, on its side facing the bracket, this stop has means designed for the application of such rotary-action tools. Both of these means of adjustment are inaccessible and, therefore, secured against theft when the padlock is locked.

One solution envisaged consists in that the means for locking the lever in rotation with respect to the pin consist in that the bolt has a front flange which is transverse to said rod while being parallel and longitudinal to said pin, and this front flange has two flat faces which, with respect to the longitudinal operational movement of said bolt, are a paraxial face and a front face, perpendicular to one another and which, at the end of this operational movement, are coupled to respective walls which form a corner recess in the pin and which, with respect to this movement, are a transverse wall and a lateral wall, the transverse wall is pressed against the front face and the lateral wall is pressed against the paraxial face and to the front of the latter with respect to the rotary manipulation of the lever for releasing the padlock when the lock is in the open state.

In accordance with this composition, now, with the padlock locked, there is no damaging axial force on the fastening of the lock body as described above. Instead, the immobilization of the padlock in the locked position is produced by virtue of the fact that the lateral wall of the corner recess in the pin rests on the paraxial face of the front flange of the bolt, thus preventing the lever from being able to turn with respect to said pin and, therefore, the padlock from being opened in any way other than by opening the lock so that the latter can slide back, allowing said bolt to do the same.

In accordance with this solution, the sliding lock body can be the body of a key-operated lock. Moreover, this sliding lock body can preferably be the notched pin of a combination lock system with wheels which, when set to the correct opening code, allow the notched pin to slide freely whereas, when set to any position other than the correct opening code, said wheels can retain said notched pin in the pressed state corresponding to the locked padlock state. In other words, to lock the padlock it is necessary to set the combination code and press on the lock body to bring it, together with the bolt, to the position in which the lever cannot turn with respect to the pin, and then move the combination wheels into any other different position so that the device remains locked until, when the code is set using the wheels, the lock body can retract and allow the padlock to be opened by allowing said turning movement which was previously prevented.

BRIEF DESCRIPTION OF THE DRAWINGS

For a clearer idea of the nature of the present invention, the attached drawings show a preferred embodiment, which is merely illustrative and non-limiting.

FIG. 1 is a view of the padlock in the locked position, shown in longitudinal section, which includes a locking endpiece (15) in the position of relative coupling with the lever (4).

FIG. 2 is a section on the line II-II indicated in FIG. 1, leaving out the key (10) and locking endpiece (15).

FIG. 3 is like FIG. 2, but with respect to the open position.

FIG. 4 is like the previous figures and shows the maneuver of turning the lever (4), although the depiction of this is not exact, since it should be shortened longitudinally on being turned toward the observer.

FIG. 5 is an enlargement of the detail V indicated in FIG. 2.

FIG. 6 shows an antitheft collar (17) with locking endpiece (15) and loop (18).

FIGS. 7 and 8 are equivalent to FIG. 1 and show another variant embodiment in the open and locked positions, respectively.

FIGS. 9 and 10 are equivalent to FIGS. 7 and 8, respectively, and show another variant embodiment.

FIG. 11 shows, in isolation, the part of the locking projecting part (32) incorporated in FIGS. 9 and 10.

FIG. 12 is a view of FIG. 11 from the bottom.

FIG. 13 is a rod (2) according to a variant embodiment, different to FIG. 1.

FIG. 15 is a view in orthogonal projection viewed from the front of the recess in the pin (3).

FIG. 16 is a view of FIG. 15 from the bottom.

FIG. 17 is a section on the line IV-IV indicated in FIG. 15, also incorporating the front flange (36) in its position when it is not coupled to the pin (3).

FIGS. 18 and 19 are respective depictions equivalent to FIG. 14 but with respect to the subject of this preferred solution. FIG. 18 shows the padlock open and FIG. 19 shows the padlock closed.

DETAILED DESCRIPTION OF THE INVENTION

Figure 14:
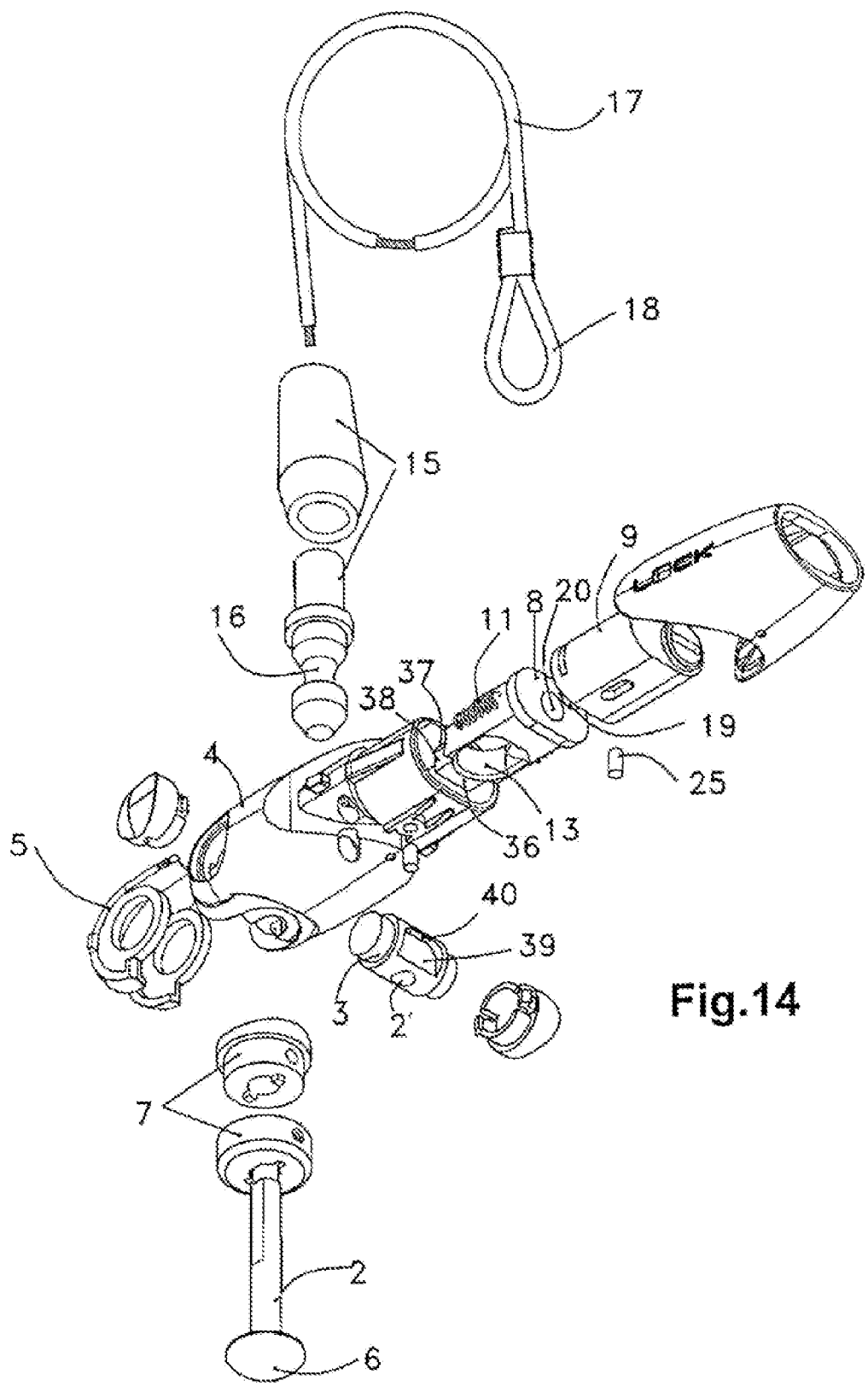
FIG. 14 is a perspective exploded view showing the improvement.

With reference to the drawings and references listed above, the attached plates show the constructional essence of the invention and a number of variant embodiments thereof, in relation to a padlock for the shaft of two-wheeled vehicles having a general composition which, as can be seen in FIG. 1, comprises a bracket (1), a rod (2), a pin (3), a lever (4), an eccentric head (5) of the lever (4), a stop (6) and a counterplate (7). The bracket (1) clamps a chassis element of the vehicle, the rod (2) passes through the ends of the bracket (1), the pin (3) is incorporated at one end of the rod (2) via rod hole (2') on the pin (3), the eccentric head (5) of the lever (4) is mounted so as to be able to rotate on said pin (3), the stop (6) is at the other end of the rod (2) to the pin (3), and the counterplate (7) is mounted so as to be able to slide freely on the rod (2) between the stop (6) and the eccentric head (5).

FIG. 1 shows the constructional essence of the invention, comprising a pin (3) which, as an independent component, is coupled securely to said rod (2) via rod hole (2') on the pin (3), and said lever (4) is mounted so as to be able to rotate on said pin (3) and has within it an assembly lying radially with respect to the pin (3) and, based on this, it incorporates, at least, a sliding bolt (8), a sliding lock body (9) actuated by a key (10) and a helical compression spring (11), and there are means for locking the lever (4) in rotation with respect to the pin (3) which are activated by actuating the key (10) in conjunction with a sliding of said assembly inside the lever (4) in which said bolt (8) and lock body (9) are each capable of adopting forward and rearward operational positions which correspond to the active and non-active states of these locking means.

FIG. 1 also shows a variant of the invention which consists in that: said lever (4) has an orifice (12) which complements a locking endpiece (15); said bolt (3) has a window (13) having one edge (14) which is transverse and rearward with respect to the operational forward movement of the bolt (8) toward the pin (3) and, in relation to said rearward and forward operational positions of this bolt (8), this window (13) can be circumscribed on the virtual cylinder defined by said lever (4) orifice or its said rear edge (14) can overlap this virtual cylinder; said edge (14) of the window (13) has a curved/convex profile which matches the profile of a recess (16) in a locking endpiece (15) which is mounted on one end of an antitheft collar (17) which has at its other end a loop (18) through which this locking endpiece (15) can pass; said compression spring (11) is mounted between the bolt (8) and the lock body (9), so that the spring (11) has one end permanently pressed against a front peg (19) of the body (9) which in its operational path fits slidingly in a rear cavity (20) in the bolt (8), while the other end of this spring (11) is housed in a hollow (21) made in the bottom of this rear cavity (20), it being possible for this spring (11) to be fully inserted in this hollow (21), in a state of maximum relative compression when said bolt (8) and body (9) are in their forward operational positions; said means for locking the lever (4) in rotation with respect to the pin (3) consist in that the bolt (8) has a flat front end face (22) which matches a flat part (23) made on the periphery of the pin (3) and in that when the bolt (8) is in its forward operational position, said end face (22) is pressed against said flat part (23); and wherein, in correspondence with the forward operational position of the lock body (9), on the inner wall of the lever (4) there is a notch (24) which can accommodate within it a locking piece (25) forming part of the lock, when it is locked by turning the key (10).

The way in which the proposed padlock works is very simple. Starting from the open position shown in FIG. 3, when the lock body (9) goes into its forward position the spring (11) compresses within the hollow (21) and the assembly consisting of this body (9) and the bolt (8) is rendered rigid in the position in which the end face (22) is pressed against the flat part (23) of the pin (3). To lock this position the key (10) is turned so that (FIGS. 2 and 5) the locking piece (25) of the lock enters the notch (24) in the lever (4). When the key (10) is withdrawn this position is maintained, preventing the lever (4) from turning with respect to the pin (3). When the key (10) is turned in the other direction (FIG. 3), the body (9) is pushed backward and, if the lever (4) is turned, the action of the end face (22) on the immobile flat part (23) produces (FIG. 4) a retraction force on the bolt (8) which can occur since the elastic compressibility of the spring (11) is now available. As can be seen from the relative position of the orifice (12) and the window (13) in FIGS. 3 and 4, in the open position it is possible to insert the locking endpiece (15) whereas, once inserted, when the device is placed in the locked position this makes it impossible to remove said endpiece (15) and, therefore, the collar (17) can be used as an antitheft device for the vehicle.

In the variant shown in FIGS. 7 and 8 there is no orifice (12) or window (13), so that the device cannot also be used as an antitheft collar (17). Functionally speaking, the locked and open positions are attained as in the above variant, with the specific feature that now the bolt (8) and the body (9) always travel together. To this end, said bolt (8) and lock body (9) are joined together in such a way as to be axially immobilized with respect to one another, said bolt (8) is mounted so as to fit slidingly in a chamber (26) and it narrows at the front forming a stem (27) which passes through the bottom of this chamber (26) and has at its end a protuberance (28) which, when the bolt (8) is in the forward position, is housed in a recess (29) in the pin (3), and said helical compression spring (11) is placed in the chamber (26) around the stem (27) and between the front of the bolt (8) and the bottom of this chamber (26).

In the variant of FIGS. 9 and 10, the bolt (8) and the body (9) are joined as in the above variant (FIGS. 7 and 8) and it necessarily requires the projecting part (32) in it, there is an orifice (12) in the lever (4) to allow the insertion of a locking projecting part (32) of an antitheft collar (17), but the device is locked and opened by means of the ball (30). To this end, said bolt (8) and lock body (9) are joined together in such a way as to be axially immobilized with respect to one another, said bolt (8) is mounted so as to fit slidingly in a chamber (26) and it narrows at the front forming a stem (27) whose tip is pressed against a ball (30) which projects partially out of the chamber (26) by a part which matches a recess (31) made in a locking projecting part (32) opposite a flat side (33) which penetrates said orifice (12), sliding while pressing against a flat section (34) formed at the periphery of the pin (3).

According to the invention there are two preferred solutions for the rod (2). One consists in that said rod (2) is screwed through said pin (3) in a selectively variable manner and widens at its other end to form a one-piece head (35) with a topography which cannot be grasped by rotary-action tools; one such possible configuration is that shown in FIG. 13; another possible configuration is that shown in FIG. 8. Another preferred rod (2) solution consists (FIG. 1) in that said rod (2) is screwed through said pin (3) in a selectively variable manner and, at the other end of this rod (2), said stop (6) is screwed into said pin (3) having an outer topography which cannot be grasped by rotary-action tools and, on its side facing the bracket (1), this stop (6) has means designed for the application of such rotary-action tools. In both cases the rod (2) cannot be manipulated when the padlock is locked.

As shown in FIG. 14 of this description, the subject of the preferred solution consists in that said means for locking the lever (4) in rotation with respect to the pin (3) consist in that the bolt (8) has a front flange (36) which is transverse to said rod (2) while being parallel and longitudinal to said pin (3), and this front flange (36) has two flat faces which, with respect to the longitudinal operational movement of said bolt (8), are a paraxial face (37) and a front face (38), perpendicular to one another and which, at the end of this operational movement, are coupled to respective walls which form a corner recess in the pin (3) and which, with respect to this movement, are a transverse wall (39) and a lateral wall (40), the transverse wall (39) is pressed against the front face (36) and the lateral wall (40) is pressed against the paraxial face (37) and to the front of the latter with respect to the rotary manipulation of the lever (4) for releasing the padlock when the lock is in the open state.

The configuration of the pin (3) is shown clearly in FIGS. 15 to 17, in addition to the illustration in FIG. 14. In particular, FIG. 17 anticipates what functionality these components will together contribute to the padlock.

Thus, the functioning of the solution recommended here is clearly illustrated if FIGS. 18 and 19 are compared: Starting with the padlock in the open position shown in FIG. 18, axial pressure on the lock body (9) causes it to slide toward the pin (3), taking the bolt (8) with it in the same direction, thus attaining the position in which the padlock is closed, shown in FIG. 19. To perform this pressing maneuver, the mechanism of the lock itself must be in the open state. Once the end pressed position is reached, all that is required is for the lock to be placed in its closed state for this pressed position to be maintained until, actuating the lock again, the latter is brought into its open state and elastically returns to its non-pressed position allowing the retraction of the bolt (8). The lock body (9) can be actuated via the key (10), i.e. the open and closed states of the lock are determined by means of appropriate action on the key (10). However, a preferred embodiment has been contemplated in which said sliding lock body (9) is a notched pin of a combination lock system with wheels which, when set to the correct opening code, allow the notched pin to slide freely whereas, when set to any position other than the correct opening code, said wheels can retain said notched pin in the pressed state corresponding to the locked padlock state. Thus, in this case it will be the combination wheels which take the place of the key (10) used in the previous case.

In the figures, the following references are indicated:
1. Bracket
2. Rod
2'. Rod hole on the pin
3. Pin
4. Lever
5. Eccentric lever (4) head
6. Rod (2) stop
7. Rod (2) counterplate
8. Sliding bolt
9. Sliding lock body
9'. Lock body with combination wheels
10. Key
11. Helical compression spring
12. Lever (4) orifice
13. Bolt (8) window
14. Window (13) edge
15. Locking endpiece
16. Endpiece (15) recess
17. Antitheft collar
18. Collar (17) loop
19. Front peg of the body (9)
20. Rear cavity of the bolt (8)
21. Cavity (20) hollow
22. Bolt (8) end face
23. Flat part of pin (3)
24. Lever (4) notch
25. Lock locking piece
26. Lever (4) chamber
27. Bolt (8) stem
28. Stem (27) protuberance
29. Pin (3) recess
30. Ball
31. Recess in projecting part (32)
32. Locking projecting part
33. Flat side of projecting part (32)
34. Flat section of pin (3)
35. One-piece head of rod (2)
36. Front flange of sliding bolt (8)
37. Paraxial face of front flange (36)
38. Front face of front flange (36)
39. Transverse wall in pin (3) recess
40. Lateral wall in pin (3) recess

The invention claimed is:

1. A padlock device for a vehicle comprising:
   a bracket having two ends, the bracket for clamping a chassis element of the vehicle;
   a rod having two ends, one end having a stop and a counterplate mounted slidably on the rod, the rod passing through the two ends of the bracket and the stop abutting on the two ends of the bracket;
   a pin having a rod hole therein, the other end of the rod fitting in the rod hole and coupled securely to the pin;
   a lever having a an eccentric head, the pin mounted in the eccentric head and the lever rotatable about the pin;
   a locking means for locking the lever to the pin to prevent rotation;
   a locking endpiece; and
   an assembly mounted in the lever, radially to the pin, the assembly comprising a slidable bolt with a window for the locking endpiece, a slidable lock body and a compression spring, where the bolt and locking body are both slidable in the lever between a forward and rearward position so as to lock and unlock the locking endpiece and the locking means.

2. The padlock device of claim 1, wherein said locking means comprising: a front flange in the slidable bolt, which is transverse to said rod while being parallel and longitudinal to said pin where the front flange has two flat faces including a paraxial face and a front face, which are perpendicular to one another; and
   a transverse wall and a lateral wall in the pin, where the transverse wall is pressed against the front face and the lateral wall is pressed against the paraxial face to lock the pin from rotation.

3. The padlock device of claim 2, wherein said slidable lock body is a key-operated lock.

4. The padlock device of claim 1, wherein said slidable lock body is a combination lock system with combination wheels.

* * * * *